(12) United States Patent
Tanaka et al.

(10) Patent No.: US 7,999,979 B2
(45) Date of Patent: Aug. 16, 2011

(54) IMAGE FORMING APPARATUS

(75) Inventors: Hiroshi Tanaka, Nara (JP); Takahiro Kawakami, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 973 days.

(21) Appl. No.: 11/440,996

(22) Filed: May 26, 2006

(65) Prior Publication Data

US 2006/0268314 A1 Nov. 30, 2006

(30) Foreign Application Priority Data

May 31, 2005 (JP) ................................. 2005-160434

(51) Int. Cl.
*G06K 15/00* (2006.01)
*H04N 1/46* (2006.01)
*G03G 15/08* (2006.01)
*B41J 2/195* (2006.01)

(52) U.S. Cl. .......... 358/534; 358/1.6; 358/1.18; 399/27; 347/7

(58) Field of Classification Search .................. 358/1.9, 358/534, 1.1, 1.2, 1.6, 1.18; 399/27; 347/7
See application file for complete search history.

(56) References Cited

U.S. PATENT DOCUMENTS

| 5,724,627 | A | * | 3/1998 | Okuno et al. | 399/27 |
| 6,029,023 | A | * | 2/2000 | Munemori et al. | 399/66 |
| 6,275,664 | B1 | * | 8/2001 | Wolf et al. | 399/8 |
| 7,147,025 | B2 | * | 12/2006 | Kitora | 152/415 |
| 2004/0036897 | A1 | * | 2/2004 | Yamauchi | 358/1.9 |
| 2005/0024670 | A1 | * | 2/2005 | Aoki | 358/1.13 |
| 2005/0185008 | A1 | * | 8/2005 | Couwenhoven et al. | 347/14 |

FOREIGN PATENT DOCUMENTS

| JP | 11-84963 A | 3/1999 |
| JP | 2001-334700 A | 12/2001 |
| JP | 2002-268484 A | 9/2002 |
| JP | 2004-86063 A | 3/2004 |
| JP | 2006-84848 A | 3/2006 |

* cited by examiner

*Primary Examiner* — James A Thompson
(74) *Attorney, Agent, or Firm* — Birch, Stewart, Kolasch & Birch, LLP

(57) ABSTRACT

In an image forming apparatus which forms an image on a photosensitive member, the image formed on the photosensitive member is classified by a respective kind of the image. The image forming apparatus comprises a storage unit which stores a cumulative value of a pixel value by a respective kind of the image; adding means for adding the pixel value of a respective pixel of the image formed on the photosensitive member, to the cumulative value stored in the storage unit and corresponding to the kind of the image; and toner consumption calculating means for calculating a toner consumption based on the cumulative value stored in the storage unit. An image forming apparatus capable of totaling the pixel value by a respective kind of the image and calculating the toner consumption by a respective kind of the image is realized.

20 Claims, 11 Drawing Sheets

F I G. 4
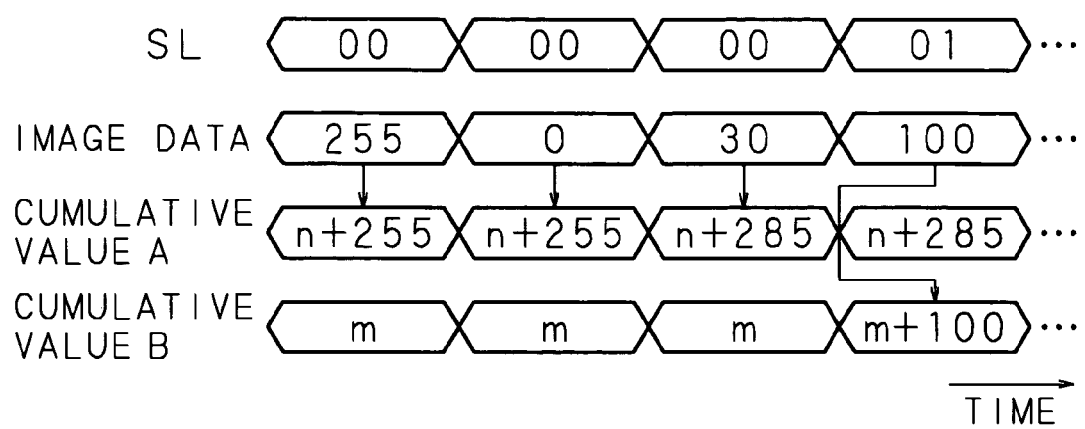

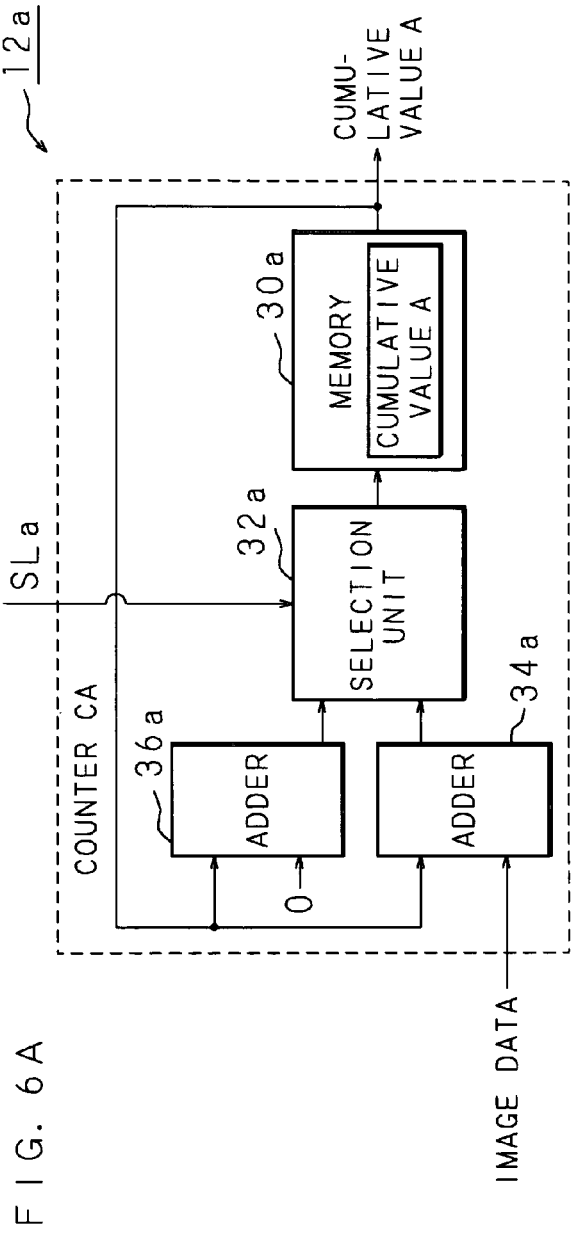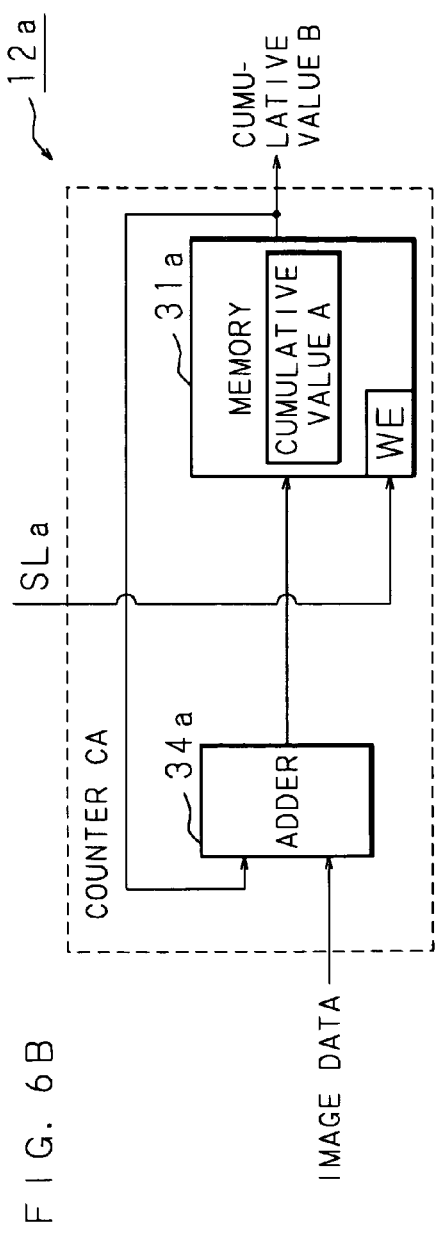

IMAGE FORMING APPARATUS

CROSS-REFERENCE TO RELATED APPLICATIONS

This Nonprovisional application claims priority under 35 U.S.C §119(a) on Patent Application No. 2005-160434 filed in Japan on May 31, 2005, the entire contents of which are hereby incorporated by reference.

BACKGROUND OF THE INVENTION

1. Field of the Invention

The present invention relates to an image forming apparatus, more specifically relates to an image forming apparatus configured to calculate a toner consumption based on a totaling result of a pixel value of each pixel of an image formed on a photosensitive member.

2. Description of Related Art

Among copying machines and multi function printers (MFPs) having a copying function using a conventional image forming apparatus, a type capable of measuring a toner consumption is known (for example, see Japanese Patent Application Laid-Open No. 11-84963 (1999) and Japanese Patent Application Laid-Open No. 2002-268484). In such a type of multi function printer, by measuring the toner consumption, it becomes possible to charge in accordance with the toner consumption and perform maintenance based on the toner consumption.

FIG. 1A is a block diagram showing an example of a counter (totaling unit) CP which totals a pixel value of each pixel formed on a photosensitive member, in the multi function printer using the aforementioned conventional image forming apparatus. The counter CP comprises a memory 90 such as a flash memory which stores a cumulative value of a pixel value and an adder 94 which adds image data (pixel value) to the cumulative value stored in the memory 90. The cumulative value of the pixel value stored in the memory 90 is almost proportional to the toner consumption. Accordingly, the toner consumption can be calculated based on the cumulative value stored in the memory 90.

FIG. 1B is a schematic view showing a relation between the image data (pixel value) and the cumulative value in the multi function printer using the aforementioned conventional image forming apparatus. It is shown that a state in which the image data (pixel value) is added to the cumulative value of the memory 90 by the adder 94. Note that "n" of the cumulative value in FIG. 1B is an integer representing the cumulative value before starting a density totaling processing of sequentially adding each image data (pixel value) shown in FIG. 1B to the cumulative value, that is, before adding the image data (pixel value) "255" to the cumulative value.

However, among the copying machines and the multi function printers using the conventional image forming apparatus having the copying function, there is also the case where not only an original image such as a read image, a print image, a FAX received image, and the like formed with a user's intention of image forming, but also the image formed without the user's intention of image forming, is formed on the photosensitive member. As examples of the image formed without the user's intention of image forming, there are an adjustment image for adjusting a density or forming position of the image formed on the photosensitive member but not transferred to a sheet, and a composing image (an image to be composed with another image) such as a forgery preventing image or an identifying image which is composed with an original image, to prevent forgery or specify a printer. Therefore, conventionally, there is also the case where totaled pixel values include the pixel value of the image formed without the user's intention of image forming.

In such case, for example, it becomes necessary for the user to pay a charge of a toner, even for the toner used in forming the adjustment image. Accordingly, when all of replenished toner is consumed in a period of time shorter than a supposed period of time, there may be an inquiry from the user such as "Is there any fault in an apparatus?". However, it is difficult for a service person to judge a cause whether or not the toner is consumed by actually copying and printing with the user's intention of image forming, whether or not the toner is consumed by a plurality of images formed without the user's intention of image forming, or whether or not the toner consumption is increased by a certain abnormality (for example, the image is developed at a density higher than an ordinary density). Therefore, it has been difficult to investigate the cause of toner consumption in a short period of time as a result.

BRIEF SUMMARY OF THE INVENTION

In view of the above-described circumstances, the present invention is provided, and a main object of the present invention is to provide an image forming apparatus capable of selectively using a cumulative value of a pixel value of images of various kinds, by totaling a pixel value of each pixel of the image formed on a photosensitive member by each kind of the image.

Another object of the present invention is to provide an image forming apparatus capable of totaling the pixel value by each kind of the image, by adding the pixel value of each pixel of the image formed on a photosensitive member, to the cumulative value corresponding to the kind of the image.

Also, another object of the present invention is to provide an image forming apparatus, wherein a cumulative processing becomes easy by selectively using the pixel value subjected to cumulative processing and the pixel value not subjected to cumulative processing.

Also, another object of the present invention is to provide an image forming apparatus, wherein a timing control, etc, of the cumulative processing becomes easy by making it easy to match the timing of processing the pixel value subjected to cumulative processing, to the timing of processing the pixel value not subjected to cumulative processing.

Also, another object of the present invention is to provide an image forming apparatus, wherein the timing control, etc of the cumulative processing becomes easy, by performing a control of permitting or prohibiting overwriting whether or not the cumulative processing is performed, on the storage unit for storing the cumulative value.

Also, another object of the present invention is to provide an image forming apparatus capable of obtaining a sum total of the cumulative value of all kinds of the image or sum total of plural cumulative values of plural optional kinds.

Also, another object of the present invention is to provide an image forming apparatus capable of separately totaling the cumulative value of the pixel value of the image such as a fixed form image previously stored in an apparatus and an original image, which is different from the fixed form image, inputted when using the apparatus.

Also, another object of the present invention is to provide an image forming apparatus capable of individually totaling the cumulative value of the pixel value of the image such as original image, composing image, and adjustment image, wherein the fixed form image is classified into the composing image to be composed with the original image, and the adjustment image for adjusting the density or forming position.

Also, another object of the present invention is to provide an image forming apparatus capable of individually totaling the cumulative value of the pixel value of each pixel of the composing image and the original image, before the composing image is composed with the original image.

Also, another object of the present invention is to provide an image forming apparatus capable of totaling each pixel value of the original image and the composing image individually and in parallel.

Also, another object of the present invention is to provide an image forming apparatus capable of calculating a toner consumption based on the cumulative value of the pixel value of the image of each kind.

The image forming apparatus according to the present invention is an image forming apparatus having image forming means for forming electrostatic latent images of images respectively constituted of multiple pixels on a photosensitive member, and forming images by developing the electrostatic latent images formed on the photosensitive member by toner, and is characterized by comprising: image discriminating means for discriminating a kind of an image formed on the photosensitive member by the image forming means; and a totaling unit for totaling a pixel value of a respective pixel constituting an image formed on the photosensitive member by the image forming means, by a respective kind of the image in accordance with a discrimination result by the image discriminating means.

In the image forming apparatus according to the present invention as described above, the pixel value of each pixel constituting the image formed on the photosensitive member is totaled at the totaling unit by each kind of the image. Therefore, the cumulative value of the pixel value can be managed by each kind of the image and can be selectively used. For example, when separately totaling the cumulative value of the pixel value of the image formed with the user's intention of image forming, and the cumulative value of the pixel value of the image formed without the user's intention of image forming, charging processing can be performed by using only the cumulative value of the pixel value of the image formed with the user's intention of image forming.

The image forming apparatus according to the present invention is characterized in that the totaling unit includes: a storage unit for storing a cumulative value of a pixel value by a respective kind of an image in accordance with a discrimination result by the image discriminating means; and adding means for adding a pixel value of a respective pixel of an image formed on the photosensitive member by the image forming means, to a cumulative value stored in the storage unit correspondingly by a kind of an image in accordance with a discrimination result by the image discriminating means, and inputting a value of an added result to the storage unit; whereby the storage unit stores an inputted value by overwriting on the cumulative value.

In the image forming apparatus according to the present invention as described above, the cumulative value of the pixel value is stored in a storage unit by each kind of the image, and the pixel value of each pixel constituting the image formed on the photosensitive member is added to the cumulative value of the image stored in the storage unit, by each kind of the image. Therefore, the pixel value can be totaled by each kind of the image.

The image forming apparatus according to the present invention is characterized in that the totaling unit further includes selecting means, to which the added result by the adding means and the cumulative vale stored in the storage unit are inputted, for selecting either of the added result by the adding means or the cumulative value stored in the storage unit in accordance with the discrimination result by the image discriminating means and inputting it to the storage unit.

In the image forming apparatus according to the present invention as described above, either of the cumulative value stored in the storage unit or an added result by the adding means is selected by selecting means, and a value thus selected is inputted to the storage unit. Accordingly, the selection by the selecting means may be switched in accordance with the kind of the image.

The image forming apparatus according to the present invention is characterized in that the totaling unit further includes zero adding means for adding zero to the cumulative value stored in the storage unit and inputting an added result to the selecting means.

In the image forming apparatus according to the present invention as described above, zero is added by the zero adding means when the cumulative value stored in the storage unit is inputted in the selecting means. Therefore, it becomes easy to make the timing matched to the timing of performing addition by the adding means. Accordingly, the processing can be made simple, thereby the timing control or the like of the cumulative processing becomes easy.

The image forming apparatus according to the present invention is characterized by further comprising overwrite controlling means for permitting or prohibiting an overwrite of the cumulative value by the value inputted to the storage unit, in accordance with the discrimination result by the image discriminating means.

In the image forming apparatus according to the present invention as described above, in accordance with the kind of the image, overwriting of an added result by the adding means on the cumulative value stored in the storage unit is permitted or prohibited. Therefore, the processing becomes simple, thereby the control of timing or the like of the cumulative processing becomes easy.

The image forming apparatus according to the present invention is characterized by further comprising totaling means for obtaining a sum total of the cumulative value of all the kinds of images or a sum total of plural cumulative values of optional plural kinds stored in the storage unit.

In the image forming apparatus according to the present invention as described above, the sum total of the cumulative value of the pixel value by each kind of the image is obtained. In addition, the sum total of only the cumulative value of the pixel value of each optional image is obtained. Therefore, it is possible to obtain the sum total of the cumulative value of the pixel value for only the kind of the image as needed, such as the cumulative value of the pixel value of the image to be charged.

The image forming apparatus according to the present invention is characterized in that the kind of the image formed on the photosensitive member by the image forming means is a fixed form image previously stored in the apparatus and an original image inputted when using the apparatus.

In the image forming apparatus according to the present invention as described above, the kind of the image includes such as the fixed form image previously stored in the apparatus, and the original image inputted when using the apparatus. Accordingly, the cumulative value of the pixel value can be individually totaled by each kind of the image such as the original image and fixed form image. The original image is a read image such as an image scanner or the image inputted by the user such as a print image received from a computer, and the image formed with the user's intention of image forming. Meanwhile, in many cases, the fixed form image is the image used for adjustment, and is frequently formed without the user's intention of image forming. Accordingly, it can be used in performing charging process based on only the cumulative value of the pixel value of the original image, which is the image formed with the intention of the user.

The image forming apparatus according to the present invention is characterized in that the fixed form image is a composing image to be composed with the original image and an adjustment image for adjusting density or forming position.

In the image forming apparatus according to the present invention as described above, the kind of the fixed form image includes the composing image to be composed with the original image and the adjustment image for adjusting the density or the forming position. Accordingly, the cumulative value of the pixel value can be individually totaled by each kind of the image such as the original image, composing image, and adjustment image. The original image is the read image such as an image scanner, or print image received from the computer, i.e. the image formed with the user's intention of image forming. Meanwhile, the composing image is a forgery preventing pattern such as x, which is composed when the original is paper currency, and the like, or an identification pattern for specifying the apparatus which performs printing, and is formed without the user's intention of image forming in many cases. Also, the adjustment image is an adjustment pattern, etc, of the density or image forming position, and is also formed without the user's intention of image forming in many cases. Accordingly, it can be used in performing the charging process based on only the cumulative value of the pixel value of the original image, which is the image formed with user's intention of image forming.

The image forming apparatus according to the present invention is characterized by further comprising image composing means for composing the composing image with the original image, wherein the totaling unit totals a pixel value of a respective pixel constituting each of the composing image and original image, before the composing image is composed with the original image.

In the image forming apparatus according to the present invention as described above, the pixel value is totaled by each kind of the image such as the composing image and original image before the composing image is composed with the original image. Therefore, the pixel value of the original image and the pixel value of the composing image can be individually totaled. Accordingly, it can be used in performing the charging process based on only the cumulative value of the pixel value of the original image.

The image forming apparatus according to the present invention is characterized in that the totaling unit further includes: first adding means for adding a pixel value of a respective pixel constituting the original image, to the cumulative value corresponding to the original image; and second adding means for adding the pixel value of a respective pixel constituting the composing image, to the cumulative value corresponding to the composing image.

In the image forming apparatus according to the present invention as described above, the processing of obtaining the cumulative value of the pixel value of the original image and the processing of obtaining the cumulative value of the pixel value of the composing image are performed by separate adding means. Therefore, the cumulative value of the pixel value of the original image and the cumulative value of the pixel value of the composing image can be obtained in parallel.

The image forming apparatus according to the present invention is characterized by further comprising toner consumption calculating means for calculating a toner consumption by the image forming means, based on the cumulative value stored in the storage unit.

In the image forming apparatus according to the present invention as described above, it becomes possible to calculate the toner consumption based on the cumulative value stored in the storage unit. Accordingly, the toner consumption can be calculated by each kind of the image. This means that it is possible to separately totaled the cumulative value of the pixel value of the image formed with the intension of the user, and the cumulative value of the pixel value of the image formed without the intension of the user, for example. Accordingly, by calculating the toner consumption based on only the cumulative value of the pixel value of the image formed with the intension of the user, the charging processing can be performed. Of course, it is possible to calculate an overall toner consumption, as required for maintenance or the like.

The above and further objects and features of the invention will more fully be apparent from the following detailed description with accompanying drawings.

BRIEF DESCRIPTION OF THE SEVERAL VIEWS OF THE DRAWINGS

FIG. 4 is a schematic view showing the relation between the image data (pixel value) and the cumulative value, by the front stage of the density totaling unit shown in FIG. 3;

FIG. 6A and FIG. 6B are block diagrams each showing another configuration example of an essential portion of the front stage of the density totaling unit of the Embodiment 1 of the image forming apparatus according to the present invention;

DETAILE DESCRIPTION OF THE PRESENT INVENTION

Hereunder, preferred embodiments of the present invention will be specifically explained based on the drawings.

Embodiment 1

Figure 1A:
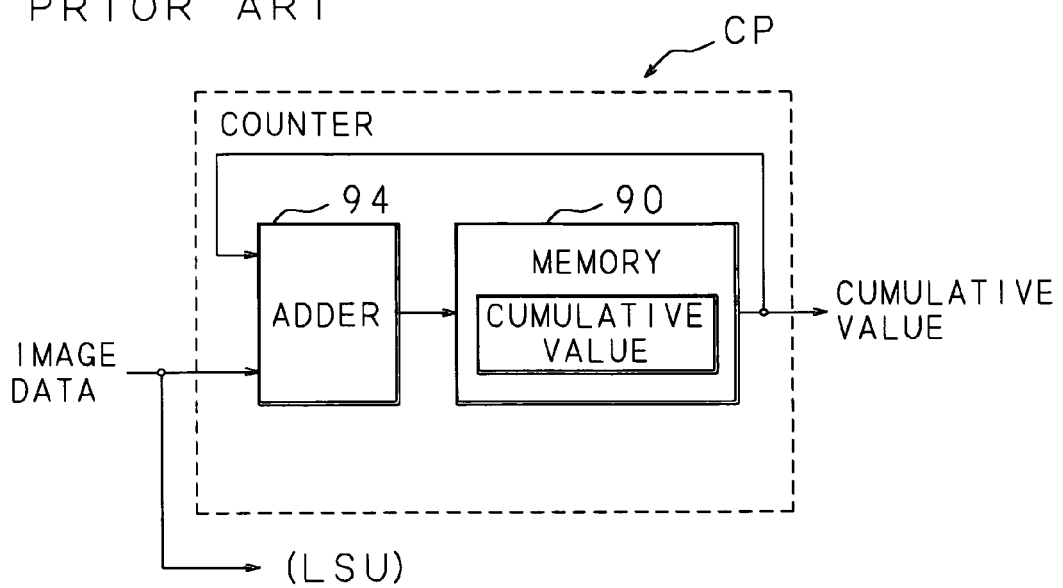
FIG. 1A is a block diagram showing an example of the conventional counter which totals a pixel value of each pixel of an image formed on a photosensitive member.
Figure 1B:
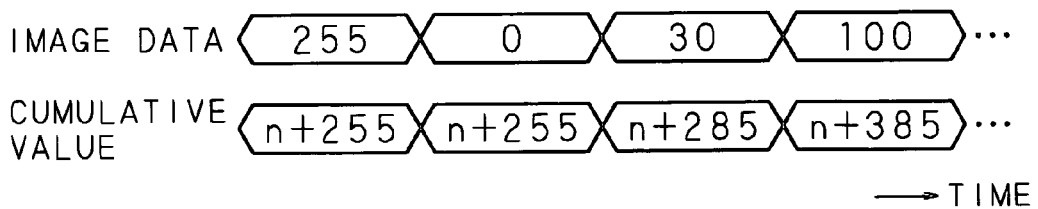
FIG. 1B is a view showing a relation between image data and a cumulative value in the conventional counter.
Figure 2:
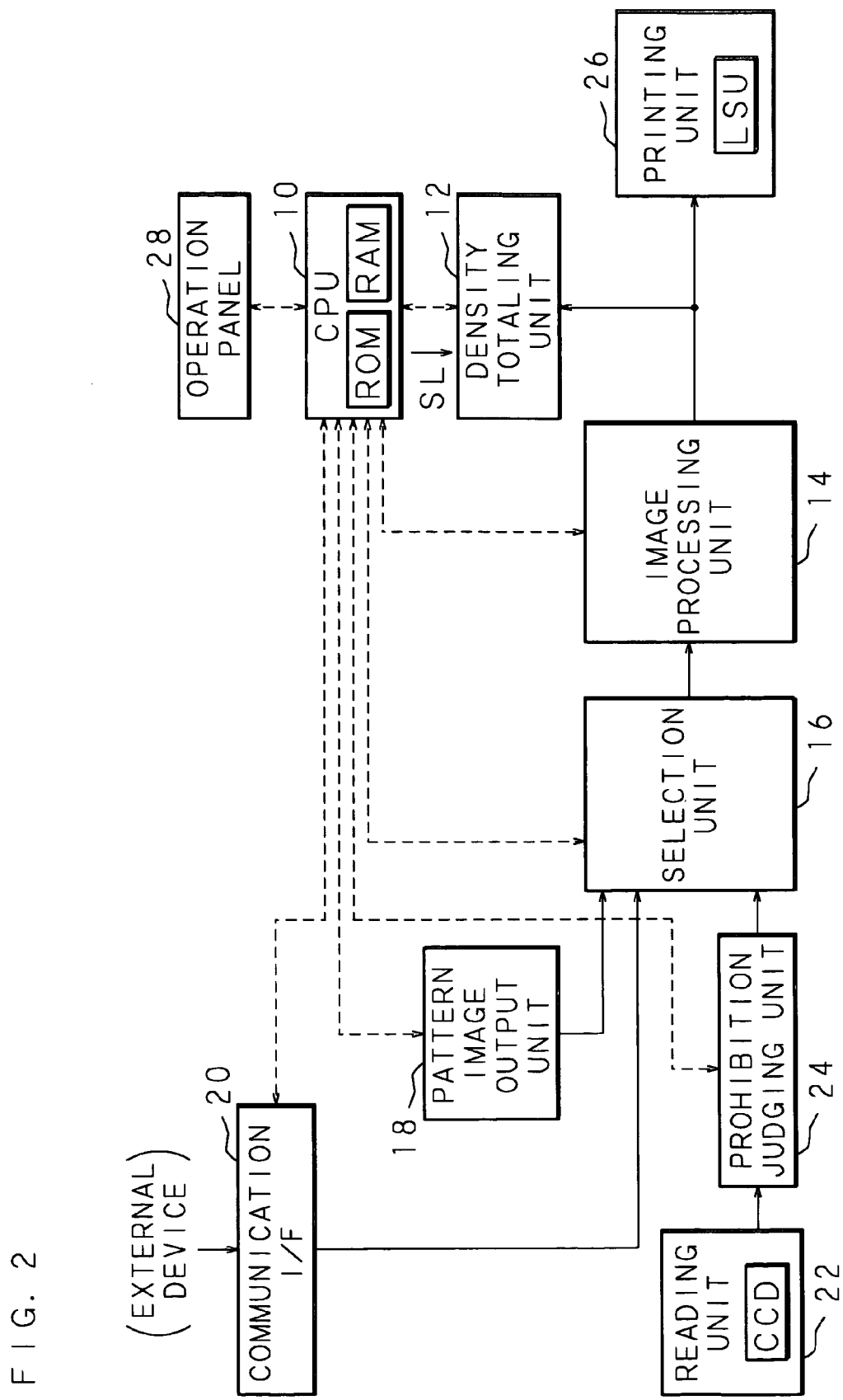
FIG. 2 is a block diagram showing a configuration example of an Embodiment 1 of an image forming apparatus according to the present invention.

FIG. 2 is a block diagram showing a configuration example of an Embodiment 1 of an image forming apparatus according to the present invention.

The image forming apparatus comprises: a reading unit 22 having a CCD (Charge Coupled Device), etc; a prohibition judging unit 24 which judges whether or not the image read by the reading unit 22 is an output prohibited image such as paper currency; a communication I/F (Interface) 20 which performs data communication with an external device such as a computer and receives an image (image data) from the external device, for example; a pattern image output unit 18 which outputs an image data of a pattern image such as an adjustment image for adjusting density or image forming position; a selection unit 16 which selects any one of an images such as the image read by the reading unit 22, the image received by the communication I/F 20, or the image data outputted by the pattern image output unit 18; an image processing unit 14 which performs image processing to the image data selected by the selection unit 16; a printing unit 26 having an LSU (Laser Scanning Unit), a photosensitive member, and a developing unit, etc, to develop the image data processed by the image processing unit 14, to a toner developed image by the developing unit and form it on a sheet; a density totaling unit (totaling unit) 12 which totals the density (pixel value) of each pixel of the image data outputted to the printing unit 26 from the image processing unit 14; a CPU (Central Processing Unit) 10 having a ROM (Read Only Memory) in which control programs are stored and a RAM (Random Access Memory) in which temporary data is stored, to perform a control of each of the aforementioned units in the apparatus; an operation panel 28 connected to the CPU 10 and having a liquid crystal display panel, operation keys and so forth, and the like.

When the user presses a copy button of the operation panel 28, by the control of the CPU 10, an original image is read by the reading unit (CCD) 22 and is processed by the image processing unit 14. The image processing unit 14 converts the original image into an image data according to the number of gradations (such as an image data of 8 bits, when 1 pixel is expressed by 256 gradations), and sends the converted image data to the printing unit 26. The printing unit 26 comprises the LSU and the photosensitive member and the developing unit, etc, not shown. Accordingly, the printing unit 26 forms an image (electrostatic latent image) based on the image data by a laser beam on the surface of the photosensitive member, and develops the electrostatic latent image formed on the surface of the photosensitive member to the toner developed image by the developing unit, thus forming the image. In this way, the image developed on the surface of the photosensitive member is transferred on the sheet. Namely, the printing unit 26 functions as image forming means.

Figure 3:
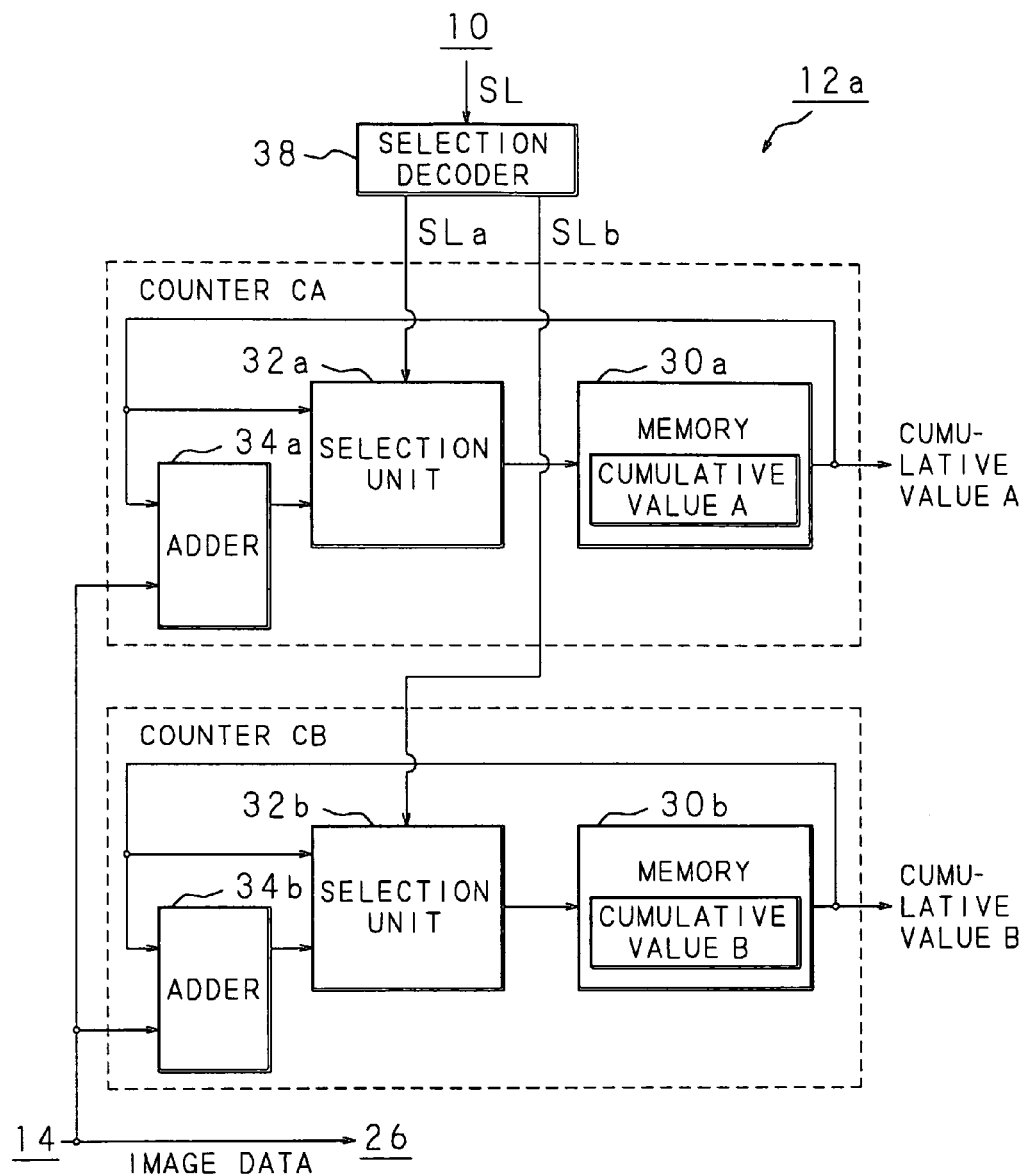
FIG. 3 is a block diagram showing a configuration example of an essential portion of a front stage of a density totaling unit of the Embodiment 1 of the image forming apparatus according to the present invention.

FIG. 3 is a block diagram showing a configuration example of an essential portion of the front stage of the density totaling unit 12 of the Embodiment 1 of the image forming apparatus according to the present invention. Note that the density totaling unit 12 is composed of a front stage mainly configured by a counter, and a rear stage which adds and selects cumulative value of the pixel value by each kind of the image totaled by the counter of the front stage.

A front stage 12a of the density totaling unit 12 comprises a plurality of counters (two counters CA and CB in the example of the figure) into which the image data is inputted, and a selection decoder 38 into which a signal SL outputted from the CPU 10 is inputted. The counter CA comprises a memory (storage unit) 30a such as a flash memory for storing a cumulative value A, an adder 34a as adding means for adding the density (pixel value) of the image data to the cumulative value A stored in the memory 30a, and a selection unit 32a as selecting means for selecting either of the cumulative value A stored in the memory 30a or the added result of the adder 34a. The cumulative value A stored in the memory 30a is sequentially totaled by being overwritten by a value selected by the selection unit 32a. The counter CB has the same configuration as that of the counter CA. Specifically, similarly to the counter CA, the counter CB comprises a memory 30b for storing a cumulative value B, an adder 34b, and a selection unit 32b, and the cumulative value B stored in the memory 30b is overwritten by the value selected by the selection unit 32b.

The selection decoder 38, to which the signal SL is given from the CPU 10, is connected to the selection unit 32a of the counter CA and the selection unit 32b of the counter CB. By signals SLa and SLb outputted from the selection decoder 38, the selection of the selection units 32a and 32b is respectively controlled. In this Embodiment, the counter CA performs density totaling processing to the original image, that is, the image data of the image read by the reading unit 22 or the image received by the communication I/F 20. Meanwhile, the counter CB performs the density totaling processing to the adjustment image, that is, the image data outputted by the pattern image output unit 18.

The CPU 10 outputs "00" as the signal SL when the CPU 10 makes the selection unit 16 select the image data from the reading unit 22 or the communication I/F 20 (selection state "00"). The selection decoder 38, which receives the signal SL of "00", outputs "1" as the signal SLa, so that the selection unit 32a of the counter CA selects an output value (cumulative value A+pixel value) from the adder 34a (selection state "1"). Also, at the same time, the selection decoder 38 outputs "0" as the signal SLb, so that the selection unit 32b of the counter CB selects the output value (cumulative value B) from the memory 30b. Accordingly, in this case, the cumulative value A of the memory 30a of the counter CA becomes the cumulative value of the pixel value of each pixel constituting the original image. However, the cumulative value B of the memory 30b of the counter CB does not change.

On the other hand, the CPU 10 outputs "01" as the signal SL when the CPU makes the selection unit 16 select the image data from the pattern image output unit 18 (selection state "01"). The selection decoder 38, which receives the signal LS of "01", outputs "0" as the signal SLa, so that the selection unit 32a of the counter CA selects the output value (cumulative value A) from the memory 30a (selection state "0"). Also, at the same time, the selection decoder 38 outputs "1" as the signal SLb, so that the selection unit 32b of the counter CB selects the output value (cumulative value B+pixel value) from the adder 34b. Accordingly, in this case, the cumulative value A of the memory 30a of the counter CA does not change. However, the cumulative value B of the memory 30b of the counter CB becomes the cumulative value of the pixel value of each pixel constituting the pattern image.

As described above, the CPU 10 functions as image discriminating means for discriminating the kind of the image.

FIG. 4 is a schematic view showing the relation between the image data (pixel value) and the cumulative value, by the front stage 12a of the density totaling unit 12 shown in FIG. 3.

When the signal SL is "00", the pixel value (density) of the image data is totaled by the counter CA. Accordingly, in this case, the pixel value is added to the cumulative value A. On the other hand, when the signal SL is "01", the pixel value of the image data is totaled by the counter CB. Accordingly, in this case, the pixel value is added to the cumulative value B. Note that, in FIG. 4, both of "n" of the cumulative value A and "m" of the cumulative value B are integers, each representing the cumulative value shown in FIG. 4 before the density totaling processing is started.

Figure 5A:
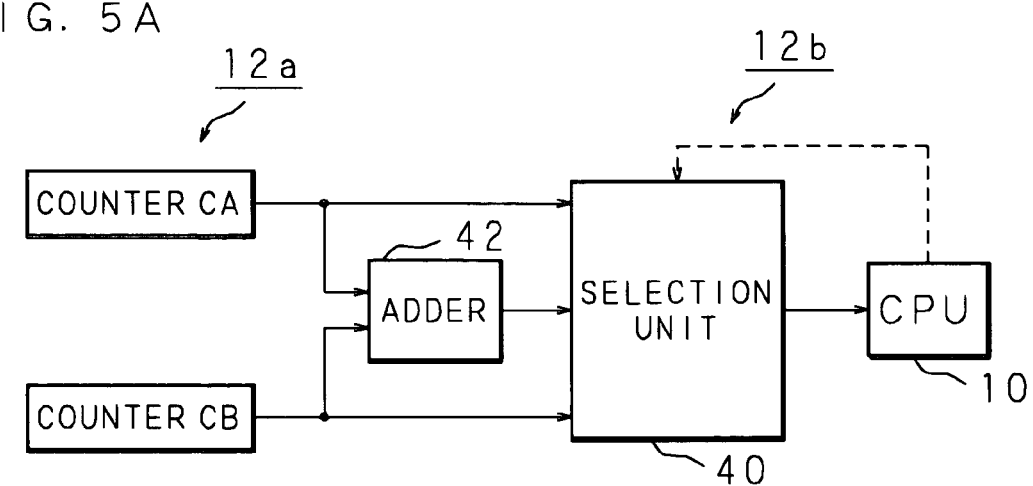
FIG. 5A is a block diagram showing a configuration example of an essential portion of a rear stage of the density totaling unit of Embodiment 1 of the image forming apparatus according to the present invention.

FIG. 5A is a block diagram showing a configuration example of an essential portion of the rear stage of the density totaling unit 12 in the Embodiment 1 of the image forming apparatus according to the present invention.

The rear stage 12b of the density totaling unit 12 comprises an adder 42 for adding the cumulative value A of the counter CA and the cumulative value B of the counter CB of the front stage 12a, and a selection unit 40 for selecting any one of the cumulative value A of the counter CA, the cumulative value B of the counter CB, and an added value of the adder 42. The signal selected by the selection unit 40 is outputted to the CPU 10. Note that the selection by the selection unit 40 is controlled by the CPU 10.

When three or more counters are used in the front stage 12a of the density totaling unit 12, it is possible for the adder 42 to total the cumulative values of all counters, or total the cumulative values of optional plural counters.

Figure 5B:
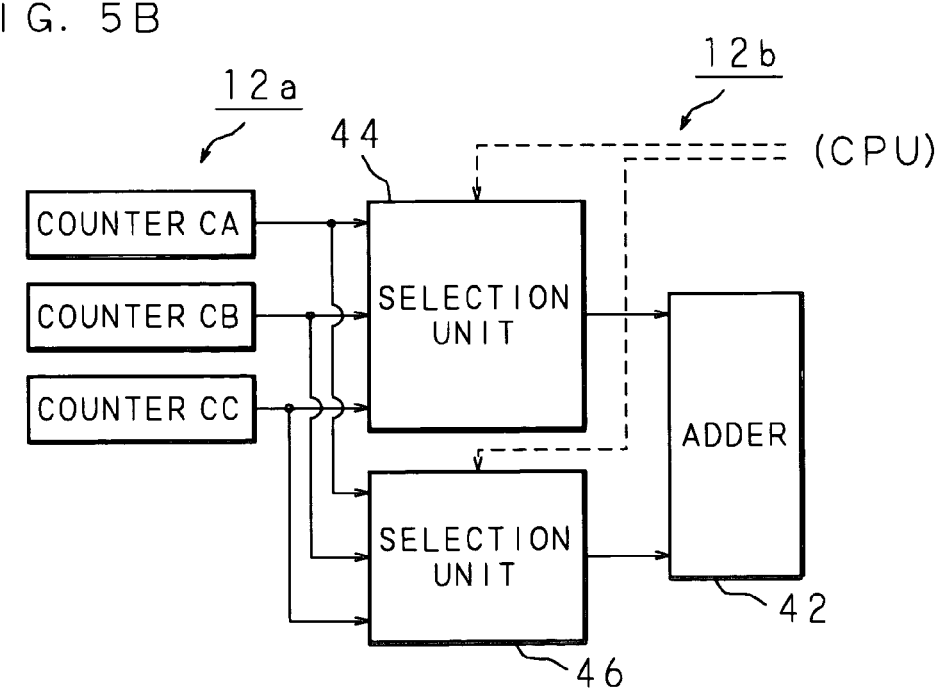
FIG. 5B is similarly the block diagram showing another configuration example of an essential portion.

FIG. 5B is a block diagram showing another configuration example of an essential portion of the rear stage 12b of the density totaling unit 12. In the example shown in FIG. 5B, three counters (counter CA, CB, and CC) are used in the front stage 12a. Any one of the cumulative values A, B, C of each of the counters CA, CB, and CC is selected by two selection units 44 and 46, and a selection result is added by the adder 42. That is, two selection units 44 and 46 and the adder 42 function as totaling means. Note that the selection by the selection units 44 and 46 is controlled by the CPU 10.

Here, when the printing unit 26 performs printing of plural colors such as Y (Yellow), M (Magenta), C (Cyan), and BK (Black), the density totaling processing can be performed for each color by providing the counters CA and CB sown in FIG. 3 and FIG. 4 respectively for each of colors C, M, Y, and BK.

When an original is set in the reading unit 22 and the operation panel 28 receives a copy start instruction, the CPU 10 controls the reading unit 22 to read an original image. When a judgment result of the read image by the prohibition judging unit 24 shows output permission, the CPU 10 makes the selection unit 16 select the image data read by the reading unit 22 by controlling the selection unit 16, specifically giving the signal SL="00". When the judgment result by the prohibition judging unit 24 shows output prohibition, the CPU 10 makes the pattern image output unit 18 output the image data of the pattern image by controlling the pattern image output unit 18, and makes the selection unit 16 select the image data outputted from the pattern image output unit 18 by controlling the selection unit 16, specifically giving the signal SL="01".

In addition, at the aforementioned control, the CPU 10 outputs to the density totaling unit 12 the signal SL for causing the selection unit 16 to select the image data. The image data selected by the selection unit 16 is processed by the image processing unit 14, thereafter is sent to the printing unit 26 and is formed on a sheet. Simultaneously, the above image data is also sent to the density totaling unit 12 and is subjected to density totaling processing based on the signal SL. The density regarding the image data read by the reading unit 22 (in a case of signal SL="00") is totaled by the counter CA of the density totaling unit 12, and the density regarding the image data outputted from the pattern image output unit 18 (in a case of signal SL="01") is totaled by the counter CB of the density totaling unit 12.

When the communication I/F 20 receives an image data and a printing instruction from the external device, the CPU 10 makes the selection unit 16 select the image data from the communication I/F 20 by controlling the selection unit 16, specifically giving the signal SL="00". Also, the CPU 10 outputs to the density totaling unit 12 the signal SL for causing the selection unit 16 to select the image data. The image data selected by the selection unit 16 is processed by the image processing unit 14, thereafter, is sent to the printing unit 26 and is formed on a sheet. Simultaneously, the above image data is also sent to the density totaling unit 12 and is subjected to density totaling processing based on the signal SL. The density regarding the image data received by the communication I/F 20 (in a case of signal SL="00") is totaled by the counter CA of the density totaling unit 12.

When an adjustment instruction of the image forming position is received by the operation panel 28 for maintenance, or when an adjustment of the image forming position is performed for automatic maintenance processing or the like, the CPU 10 makes the pattern image output unit 18 output the image data of the pattern image by controlling the pattern image output unit 18, and makes the selection unit 16 select the image data from the pattern image output unit 18 by controlling the selection unit 16, specifically by giving the signal SL="01". In addition, at the aforementioned control, the CPU 10 outputs to the density totaling unit 12 the signal SL for causing the selection unit 16 to select the image data. The image data selected by the selection unit 16 is processed by the image processing unit 14, thereafter, is sent to the printing unit 26. The printing unit 26 forms the electrostatic latent image on the surface of the photosensitive member (not shown) based on the image data thus sent, and performs an adjustment processing of the image forming position (however, image formation onto the sheet is not performed). Further, the image data thus sent to the printing unit 26 is also sent to the density totaling unit 12, and is subjected to density totaling processing based on the signal SL. The density regarding the image data outputted from the pattern image output unit 18 (in a case of the signal SL="01") is totaled by the counter CB of the density totaling unit 12.

The CPU 10 reads the cumulative value A of the counter CA from the density totaling unit 12, for example, and calculates the toner consumption based on the cumulative value A thus read, and based on the toner consumption thus calculated, for example, performs charging processing. Namely, the CPU 10 functions as toner consumption calculating means. However, such a charging processing is well known. The cumulative value A does not include the cumulative value B relating to the pattern image (adjustment image) not intended by a user, such as an adjustment mark of the image forming position. Accordingly, the cumulative value A represents a cumulative value relating only to a usual read image or the print image (original image) intended by the user.

Note that the configuration of plural counters of the front stage 12a of the density totaling unit 12 is not limited to the configuration shown in FIG. 3, but an optional configuration can be adopted. FIG. 6A and FIG. 6B are block diagrams each showing another configuration example of an essential portion of the front stage 12a of the density totaling unit 12 in the Embodiment 1 of the image forming apparatus according to the present invention.

In the example shown in FIG. 6A, an adder 36a is interposed at a portion where the cumulative value A is inputted from the memory 30a to the selection unit 32a of the counter CA shown in FIG. 3. The adder 36 adds zero to the cumulative value A stored in the memory 30a and outputs added result to the selection unit 32a. Namely, the adder 36 functions as zero adding means. By appending the aforementioned adder 36a for adding zero, both of two inputs to the selection unit 32a can be subjected to adding processing, and therefore the timing of the cumulative processing is easy to be matched.

In the example shown in FIG. 6B, while the selection unit 32a is removed from the counter CA shown in FIG. 3, a write enable terminal WE, to which the signal SLa outputted from the selection decoder 38 is inputted based on the signal SL outputted from the CPU 10, is provided in the memory 31a. For example, the write enable terminal WE is controlled so that the memory 31a can be overwritten when the signal SLa is "1", and the memory 31a can not be overwritten when the signal SLs is "0". Namely, the CPU 10 functions as overwrite controlling means.

The added value of the cumulative value A and the pixel value is always outputted to the memory 31a from the adder 34a. Accordingly, for example, only when the signal SL is "1" (overwrite is enabled), the cumulative value A of the memory 31a is overwritten on the added value. Note that in FIG. 6A and FIG. 6B, for convenience of explanation, the counter CA is given as an example, however the same thing can be said for the counter CB.

Figure 7:
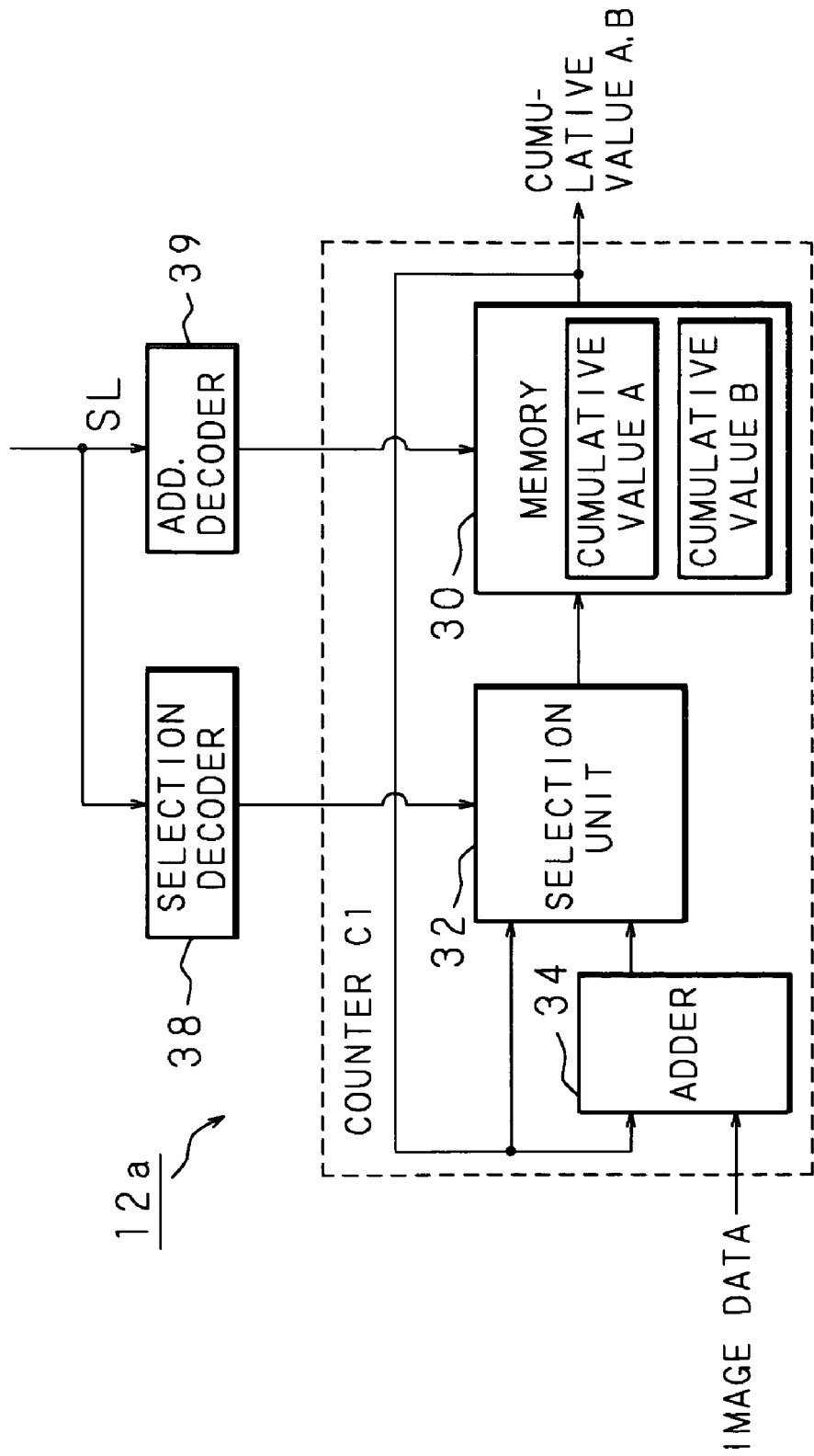
FIG. 7 is a block diagram showing another configuration example of an essential portion of the front stage of the density totaling unit of the Embodiment 1 of the image forming apparatus according to the present invention.

Also, without providing plural counters (such as CA and CB shown in FIG. 3, for example) in the front stage 12a of the density totaling unit 12, the plural cumulative values may be stored by only one counter. FIG. 7 is a block diagram showing another configuration example (configuration example having only one counter as described above) of an essential portion of the front stage 12a of the density totaling unit 12 in the Embodiment 1 of the image forming apparatus according to the present invention.

The front stage 12a of the density totaling unit 12 shown in FIG. 7 comprises one counter C1, a selection decoder 38, and an address decoder 39. The counter C1 has almost the same configuration as that of the respective counters CA and CB shown in FIG. 3. That is, the counter C1 comprises a memory 30, a selection unit 32, and an adder 34. However, in the memory 30, both of the cumulative value A and the cumulative value B are stored. The address decoder 30 specifies a storage address of the memory 30 based on the signal SL given from the CPU 10. For example, when the signal SL is "00", a storage address of the cumulative value A is specified, and when the signal SL is "01", the storage address of the cumulative value B is specified. Accordingly, the cumulative value stored in the storage address specified by the address decoder 39 based on the signal SL is updated by the added value of itself and the pixel value.

In the aforementioned Embodiment 1, for the convenience of explanation, two cumulative values A and B are given as examples. However, it is also possible to perform a cumulative processing by dividing into optional numbers of cumulative values. For example, the cumulative processing is possible not by totaling the cumulative value A which is obtained by getting together the pixel values of the read image and the print image, but by individually totaling pixel value of the read image as a cumulative value A1 and the pixel value of the print image as a cumulative value A2, respectively. In the same way, the cumulative processing is also possible not by totaling the cumulative value B which is obtained by getting together the pixel values of the adjustment pattern of the image forming position and the adjustment pattern of density or the like, but by individually totaling the pixel value of the adjustment pattern of the image forming position as a cumulative value B1 and the pixel value of the adjustment pattern of density as a cumulative value B2, respectively.

Embodiment 2

In the aforementioned Embodiment 1, explanation has been given to the case of separately performing the density totaling processing to the original image such as the read image or the print image, and the adjustment image for adjusting the density or the image forming position. However, in some cases, a forgery preventing image, an identifying image for specifying a printer, or the like is composed with the read image or the print image. When such image composition is performed, the density totaling processing of the image (original image) before composition such as read image or print image, and the density totaling processing of a composing image (an image to be composed with another image) such as forgery preventing image or identifying image are performed before both images are composed.

Figure 8:
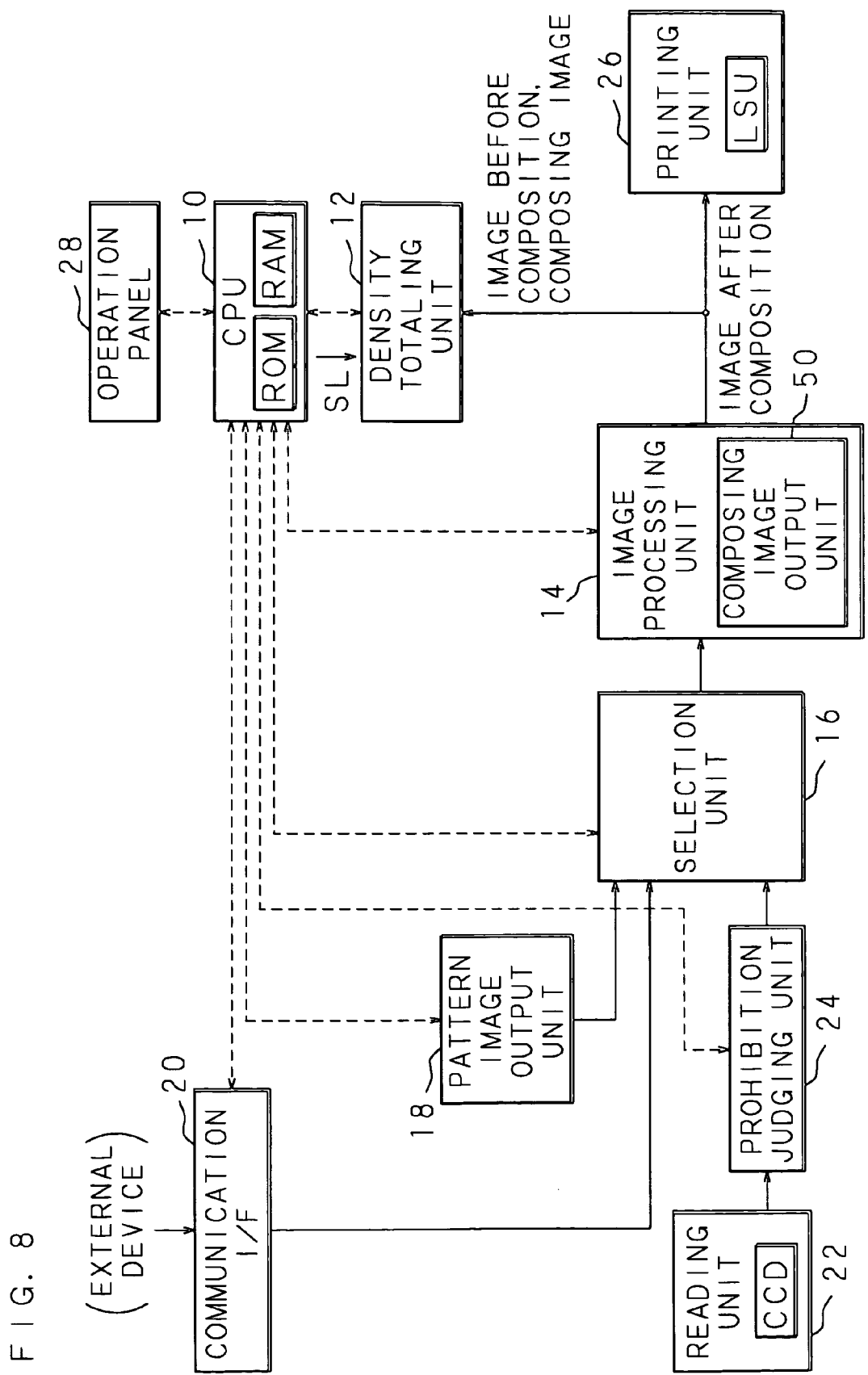
FIG. 8 is a block diagram showing a configuration example of an Embodiment 2 of the image forming apparatus according to the present invention.

FIG. 8 is a block diagram showing a configuration example of the Embodiment 2 of the image forming apparatus according to the present invention.

Note that the image forming apparatus in the Embodiment 2 has almost the same configuration as that in the Embodiment 1 shown in FIG. 2. However, the image processing unit 14 of the Embodiment 2 has a composing image output unit 50 for performing composition processing of composing the composing image with the original image, differently from the case of the Embodiment 1. The density totaling unit 12 performs a density totaling processing of the composing image and a density totaling processing of the image before composition.

Figure 9:
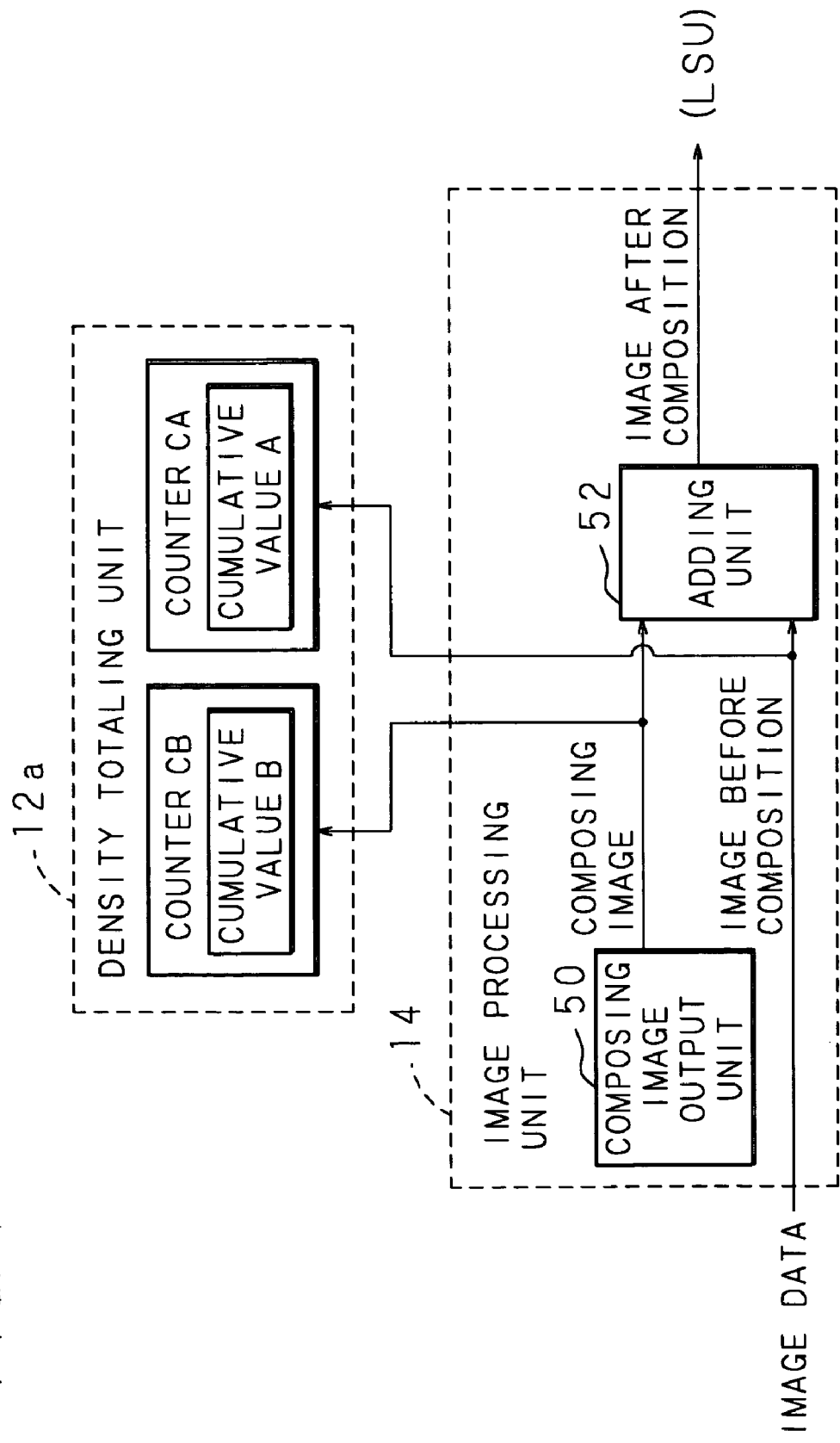
FIG. 9 is a block diagram showing a specific configuration example of an image processing unit and the front stage of the density totaling unit of the Embodiment 2 of the image forming apparatus according to the present invention.

FIG. 9 is a block diagram showing a specific configuration example of the image processing unit 14 and the front stage 12a of the density totaling unit 12 of the Embodiment 2 of the image forming apparatus according to the present invention. The image processing unit 14 comprises the composing image output unit 50 which outputs the image data of the composing image, and an adding unit 52 which composes the image by adding each pixel of the image data of the composing image outputted by the composing image output unit 50 and each pixel of the image data of the original image (image before composition) read by the reading unit 22 or received by the communication I/F 20. The adding unit 52 outputs the image data of the image after composition to the printing unit 26 (LSU). Note that the composition processing of the image itself performed by the adding unit 52 is well known, and the adding unit 52 functions as image composing means.

Figure 10:
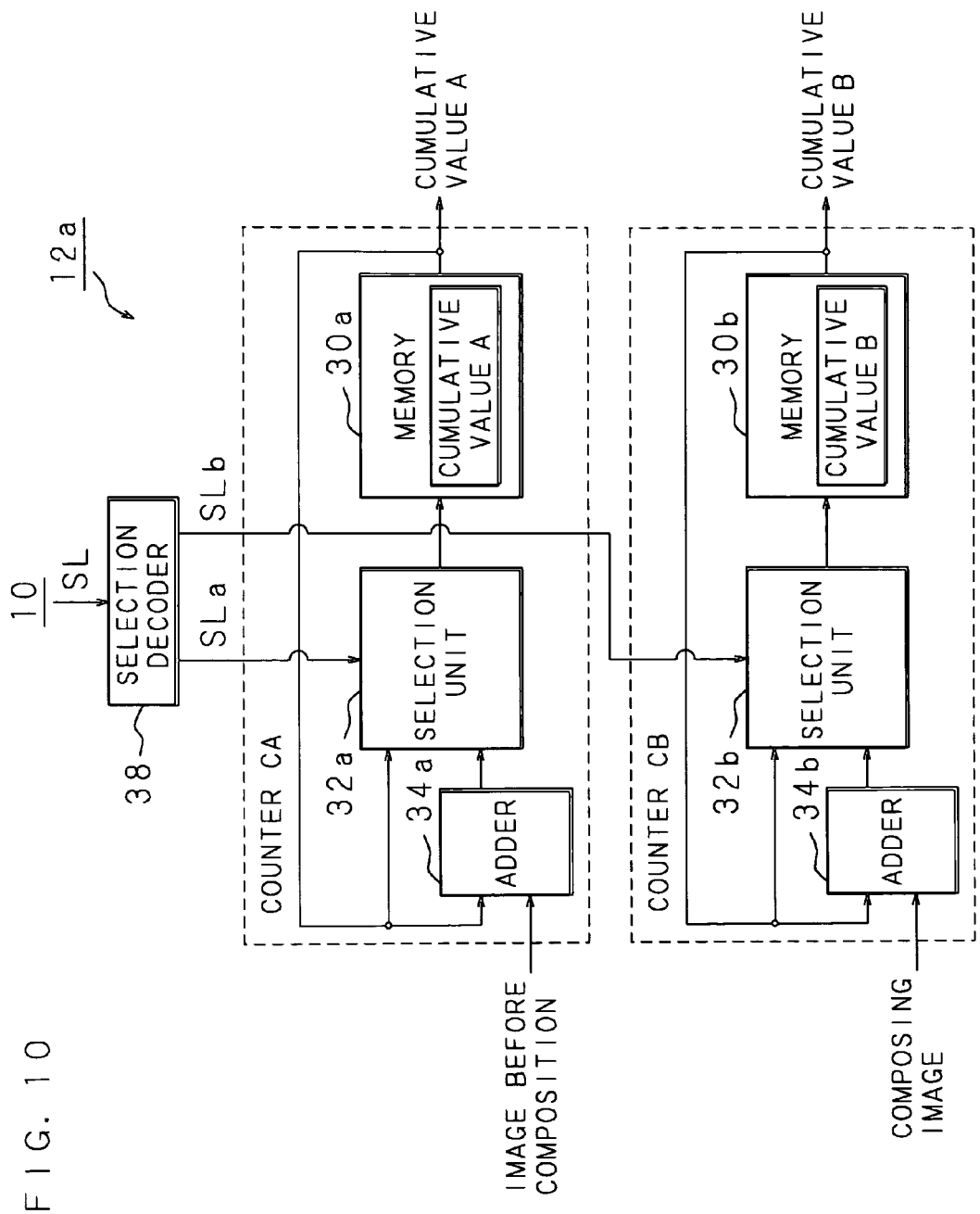
FIG. 10 is a block diagram showing a further specific configuration example of the density totaling unit of the Embodiment 2 of the image forming apparatus according to the present invention.

The front stage 12a of the density totaling unit 12 comprises two counters (counter CA and counter CB). FIG. 10 is a block diagram showing a further specific configuration example of the front stage 12a of the density totaling unit 12 in the Embodiment 2 of the image forming apparatus according to the present invention.

The front stage 12a of the density totaling unit 12 has almost the same configuration as the case of the Embodiment 1 (see FIG. 3). However, the image data of the image before composition before being inputted to the adding unit 52 is inputted in the counter CA, and the image data of the composing image before being inputted to the adding unit 52 is inputted in the counter CB. The adder 34a and the selection unit 32a of the counter CA function as first adding means for adding the pixel value of each pixel of the image data of the image (original image) before composition to the cumulative value A stored in the memory 30a. Also, the adder 34b and the selection unit 32b of the counter CB function as second adding means for adding the pixel value of each pixel of the image data of the composing image to the cumulative value B stored in the memory 30b. Note that the rear stage 12b of the density totaling unit 12 can adopt the configuration shown in FIG. 5A or FIG. 5B of the Embodiment 1.

Figure 11:
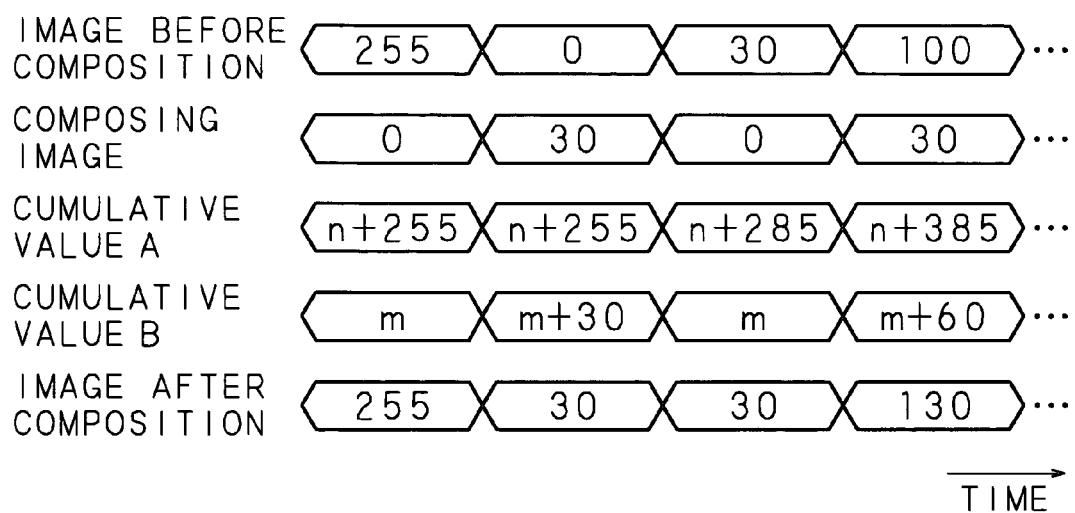
FIG. 11 is a schematic view showing a relation between image data (pixel value) and the cumulative value, by the front stage of the density totaling unit shown in FIG. 10.

FIG. 11 is a schematic view showing the relation between the image data (pixel value) and the cumulative value, by the front stage 12a of the density totaling unit 12 shown in FIG. 10.

The pixel value (density) of the image data of the image (original image) before composition is totaled by the counter CA, and the pixel value of the image data of the composing image is totaled by the counter CB. Note that both of "n" of the cumulative value A and "m" of the cumulative value B in FIG. 11 are integers, each representing the cumulative value before the density totaling processing shown in FIG. 11 is started. Also, the pixel value of the image data of the image after composition corresponds to the value obtained by adding the pixel value of the image data of the image before composition and the pixel value of the image data of the composing image.

Note that the aforementioned Embodiment 1 and Embodiment 2 may be combined, that is, both configurations may be simultaneously adopted in a same image forming apparatus.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there of are therefore intended to be embraced by the claims.

The invention claimed is:

1. An image forming apparatus, comprising:
    image forming means for forming electrostatic latent images of images respectfully constituted of multiple pixels on a photosensitive member, and forming images by developing the electrostatic latent images formed on said photosensitive member by toner, wherein said image forming means forms plural of said electrostatic latent images of images on said photosensitive member;
    image discriminating means for discriminating a kind of an image formed on said photosensitive member by said image forming means; and
    a totaling unit for totaling pixel values of a pixel constituting said plural images formed on said photosensitive member by said image forming means, by a respective kind of the image in accordance with a discrimination result by said image discriminating means,
    wherein said totaling unit comprises a first counter and a second counter;
    said first counter totals pixel values of predetermined kinds of images, which are developed with toner by the image forming means, among said plurality of images formed by said image forming means; and said second counter totals pixel values of other kinds of images, which are not developed with toner by the image forming means, among said plurality of images formed by said image forming means.

2. The image forming apparatus as set forth in claim 1, wherein said totaling unit comprises a storage unit for storing a cumulative value of a pixel value by a respective kind of an image in accordance with a discrimination result by said image discriminating means; and
    the image forming apparatus further comprises toner consumption calculating means for calculating a toner consumption by said image forming means, based on the cumulative value stored in said storage unit.

3. The image forming apparatus as set forth in claim 1, wherein the kind of the image formed on said photosensitive member by said image forming means is a fixed form image previously stored in said apparatus and an original image inputted when using said apparatus.

4. The image forming apparatus as set forth in claim 3, wherein said totaling unit comprises a storage unit for storing a cumulative value of a pixel value by a respective kind of an image in accordance with a discrimination result by said image discriminating means; and
    the image forming apparatus further comprises toner consumption calculating means for calculating a toner consumption by said image forming means, based on the cumulative value stored in said storage unit.

5. The image forming apparatus as set forth in claim 1, wherein said totaling unit includes:
    a storage unit for storing a cumulative value of a pixel value by a respective kind of an image in accordance with a discrimination result by said image discriminating means; and
    adding means for adding a pixel value of a respective pixel of an image formed on said photosensitive member by said image forming means, to a cumulative value stored in said storage unit correspondingly by a kind of an image in accordance with a discrimination result by said image discriminating means, and inputting a value of an added result to said storage unit;
    whereby said storage unit stores an inputted value by overwriting on said cumulative value.

6. The image forming apparatus as set forth in claim 5, further comprising overwrite controlling means for permitting or prohibiting an overwrite of the cumulative value by the value inputted to said storage unit, in accordance with the discrimination result by said image discriminating means.

7. The image forming apparatus as set forth in claim 6, further comprising totaling means for obtaining a sum total of the cumulative value of all the kinds of images or a sum total of plural cumulative values of optional plural kinds stored in said storage unit.

8. The image forming apparatus as set forth in claim 7, wherein the kind of the image formed on said photosensitive member by said image forming means is a fixed form image previously stored in said apparatus and an original image inputted when using said apparatus.

9. The image forming apparatus as set forth in claim 8, wherein said fixed form image is a composing image to be composed with the original image and an adjustment image for adjusting density or forming position.

10. The image forming apparatus as set forth in claim 9, further comprising image composing means for composing the composing image with the original image,
    wherein said totaling unit totals a pixel value of a respective pixel constituting each of the composing image and original image, before the composing image is composed with the original image.

11. The image forming apparatus as set forth in claim 10, wherein said totaling unit further includes:
    first adding means for adding a pixel value of a respective pixel constituting the original image, to the cumulative value corresponding to the original image; and second adding means for adding the pixel value of a respective pixel constituting the composing image, to the cumulative value corresponding to the composing image.

12. The image forming apparatus as set forth in claim 11, further comprising toner consumption calculating means for calculating a toner consumption by said image forming means, based on the cumulative value stored in said storage unit.

13. The image forming apparatus as set forth in claim 5, wherein said totaling unit further includes selecting means, to which the added result by said adding means and the cumulative value stored in said storage unit are inputted, for selecting either of the added result by said adding means or the cumulative value stored in said storage unit in accordance with the discrimination result by said image discriminating means and inputting it to said storage unit.

14. The image forming apparatus as set forth in claim 13, wherein said totaling unit further includes zero adding means for adding zero to the cumulative value stored in said storage unit and inputting an added result to said selecting means.

15. The image forming apparatus as set forth in claim 14, further comprising totaling means for obtaining a sum total of the cumulative value of all the kinds of images or a sum total of plural cumulative values of optional plural kinds stored in said storage unit.

16. The image forming apparatus as set forth in claim 15, wherein the kind of the image formed on said photosensitive member by said image forming means is a fixed form image previously stored in said apparatus and an original image inputted when using said apparatus.

17. The image forming apparatus as set forth in claim 16, wherein said fixed form image is a composing image to be composed with the original image and an adjustment image for adjusting density or forming position.

18. The image forming apparatus as set forth in claim 17, further comprising image composing means for composing the composing image with the original image,
wherein said totaling unit totals a pixel value of a respective pixel constituting each of the composing image and original image, before the composing image is composed with the original image.

19. The image forming apparatus as set forth in claim 18, wherein said totaling unit further includes:
first adding means for adding a pixel value of a respective pixel constituting the original image, to the cumulative value corresponding to the original image; and
second adding means for adding the pixel value of a respective pixel constituting the composing image to the cumulative value corresponding to the composing image.

20. The image forming apparatus as set forth in claim 19, further comprising toner consumption calculating means for calculating a toner consumption by said image forming means, based on the cumulative value stored in said storage unit.

* * * * *